Oct. 20, 1970                    J. W. HARRINGTON                    3,534,858
                                POLLUTION CONTROL DEVICE
Filed May 31, 1968                                              3 Sheets-Sheet 1
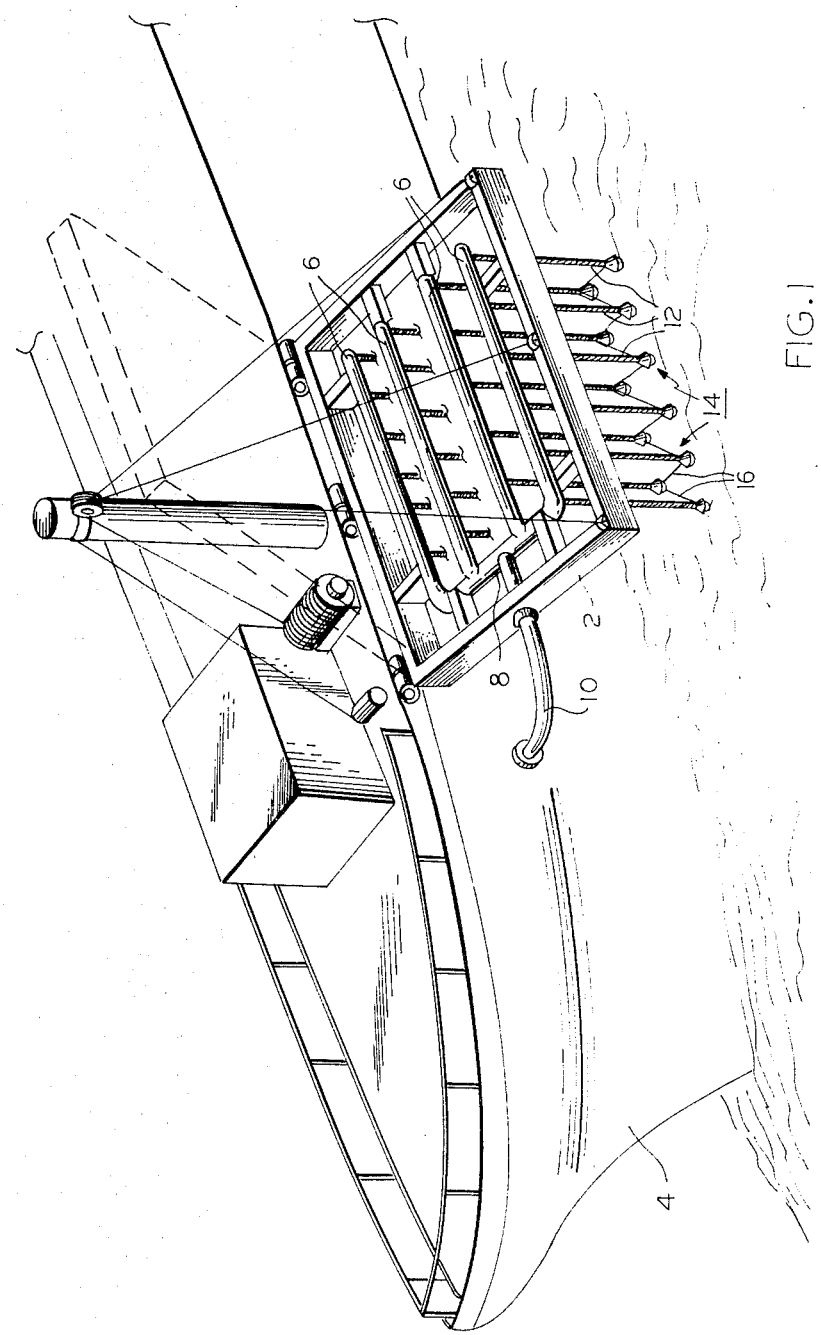
INVENTOR
JOHN W. HARRINGTON
BY *William D. Stokes*
ATTORNEY Oct. 20, 1970    J. W. HARRINGTON    3,534,858
POLLUTION CONTROL DEVICE
Filed May 31, 1968    3 Sheets-Sheet 2
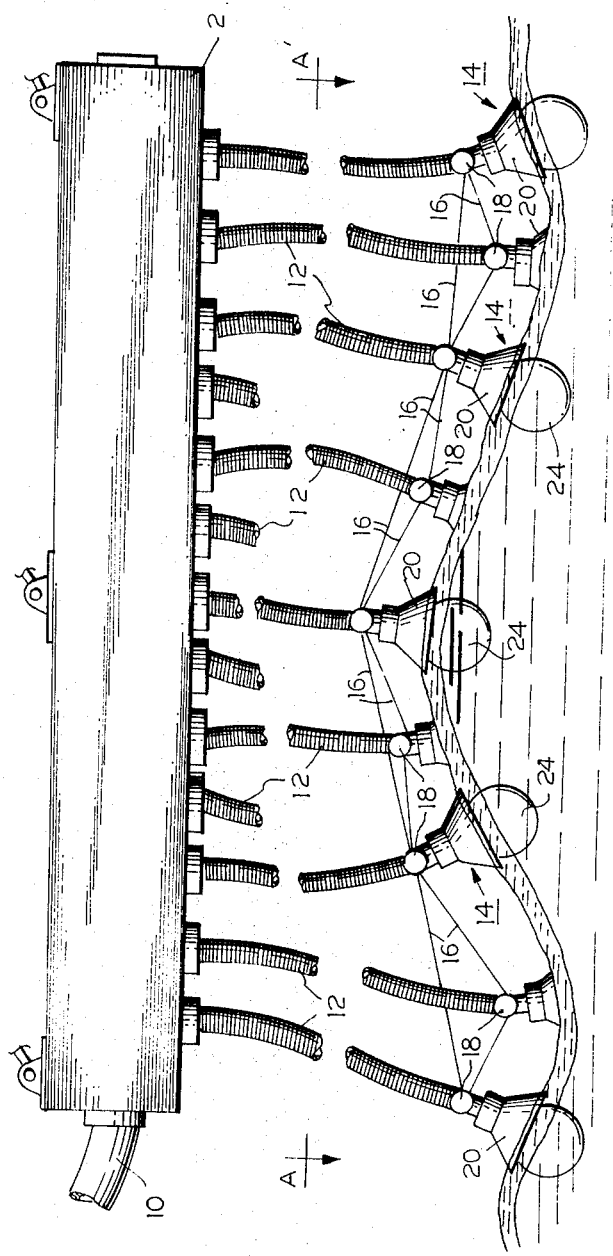
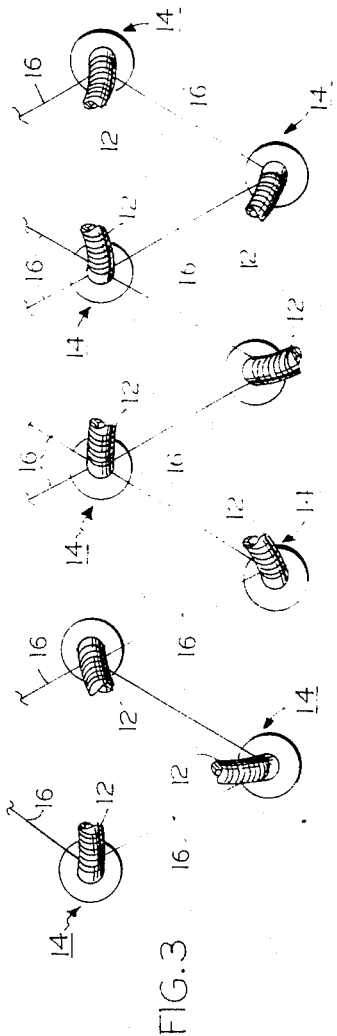
INVENTOR
JOHN W. HARRINGTON
BY *William D. Stokes*
ATTORNEY

Oct. 20, 1970      J. W. HARRINGTON      3,534,858

POLLUTION CONTROL DEVICE

Filed May 31, 1968      3 Sheets-Sheet 3

INVENTOR
JOHN W. HARRINGTON

BY *William N. Stoker*

ATTORNEY

United States Patent Office 3,534,858
Patented Oct. 20, 1970

3,534,858
POLLUTION CONTROL DEVICE
John W. Harrington, 7123 Merrimac Drive,
McLean, Va. 22101
Filed May 31, 1968, Ser. No. 733,438
Int. Cl. B01d 21/00
U.S. Cl. 210—242                                   6 Claims

ABSTRACT OF THE DISCLOSURE

An apparatus for removing pollutants, particularly oil and chemical pollutants floating on a body of liquid, comprising a flexible suction hose connected with a suitable vacuum source and a floatable skimmer being capable of moving with varying wave motions in such manner that the suction apertures provided in the skimmer are maintained substantially at all times within the layer of pollutant. For "sweeping" operations to remove large bodies of oil or chemical pollutants on water surfaces, a bed comprising headers connected with a manifold to a common suction pump is utilized. A plurality of the skimmer apparatuses are connected to each header. The individual suction lines are then tied together in such manner as to allow freedom of movement by the individual units, but function as a "sweeping" unit to cover a large area.

---

This invention is concerned with an apparatus for removing pollutants floating on a body of liquid. More particularly, the invention relates to an apparatus for cleaning liquid pollutants from the surface of water in harbors, waterways and in large open bodies of water. In particular, the invention is concerned with an apparatus for cleaning oil from the surface of bodies of water which are subjected to substantially constant wave motion.

One of the major problems facing the world today is pollution of the waterways, including the oceans, by oil and chemical spillage. Several major disasters in recent years resulting from oil tankers being wrecked in coastal waters with the attendant killing of fish and wildlife, and major losses brought about by shore pollution from escaping oil has focused international attention on the problem. Over the years innumerable devices and methods have been suggested for removing or dispersing oil and chemical waste from water surfaces. For the most part these devices and methods have utilized fluid separation methods in stationary tanks, that is, methods which require pumping the water and pollutant into large tanks, allowing gravity separation of the fluids into heavier and lighter layers, and utilization of varying skimming devices and methods to skim the quiescent fluids to remove the lighter, polluting layer. While offering a degree of pollution control in slow moving intercoastal waterways and harbors, the known methods and devices have provided scant hope for large scale pollution control. In particular, none of the proposed devices and methods have been successful in removing oil and chemical pollutants from bodies of water constantly being subjected to wave motion.

In accordance with this invention, a simple and practical apparatus is provided which successfully overcomes the disadvantages of known devices and provides a means for the immediate removal of oil and chemical pollutants from the surface of waterways as soon as the need arises. The apparatus of this invention is advantageously carried by any ship or barge and/or installed on docks for immediate use.

It is therefore one of the principle objects of this invention to provide an apparatus for removing impurities of varying thicknesses from the surface of water.

Another object of the invention is the provision of an apparatus which will effectively skim layers of impurities, such as oil, from the surface of bodies of water subjected to constant wave motion.

Still another object of this invention is the provision of a water pollution control apparatus which may be successfully utilized in connection with crew boats for offshore oil drilling rigs, oil drill rigs, salvage equipment recovering oil from sunken ships, particularly tankers, tugboats, manned barges, marinas, inland ships and ship bilges.

Another object of the invention is to provide an apparatus which may be adapted to "sweep" large or small areas of water surface.

A further object is the provision of an apparatus of simple and practical construction easily carried by and maintained on barges, ships and the like, which can be immediately and simply utilized to remove small or large quantities of a liquid pollutant from the surface of water, when the immediate need arise.

These and other objects and advantages of the invention will be more fully apparent from the following description of the invention and the accompanying drawings, in which:

FIG. 1 is a schematic view in perspective of an apparatus of this invention shown mounted on a vessel ready for operational use;

FIG. 2 is a side elevational view of an apparatus of this invention;

FIG. 3 is a longitudinal section 1 taken on the line A–A' of FIG. 2;

Figure 4:
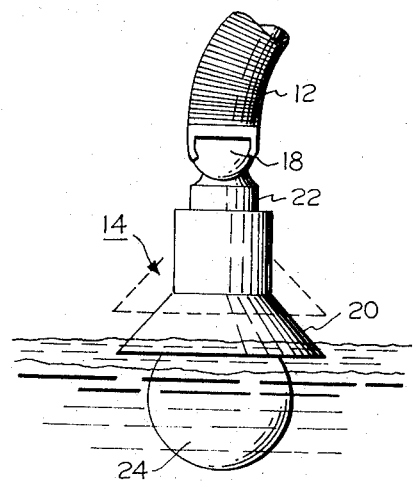
FIG. 4 is a side elevational view of a suction nozzle of this invention.

Referring now to FIGS. 1–6 inclusive, wherein like parts are identified by the same number, an apparatus in accordance with one embodiment of the invention is shown to comprise a frame 2 hingedly mounted on the side of a ship and adapted to be lowered into operational position or raised when not in use by a conventional boom and pulley system. It will be appreciated that when the apparatus of this invention is used with ocean sweeping or waterways subject to heavier wave motion, equipment means must be provided to maintain the frame support 2 at the same height above the surface of the water irrespective of wave amplitude. Mounted within frame 2 are a plurality of suction headers 6 connected to a manifold 8. A suction conduit 10 forms the connection between the manifold 8 and a suction pump (not shown). The suction pump may be conveniently mounted on the deck of the ship or within the hold of the ship. Any self-priming type vacuum pump of sufficient capacity may be satisfactorily used in connection with this invention, for example, motor driven centrifugal high efficiency water pumps having hydraulically created vacuum systems that enable the pumps to continue operation when, on occasion, the skimmer aperture (described hereinafter) is prevented by wave motion from being completely immersed in the pollutant to be pumped. In other words, for most efficient operation of the invention, a pump is used which will not lose vacuum, when, for instance, because of sea turbulence, one or more of the vacuum hose inlets rises above the liquid surface and sucks air.

It is also an advantage of this invention that one jump may effectively be used for several of the apparatuses of the invention simultaneously being used.

Connected with each of the suction headers 6 are a plurality of flexible suction hose 12. Frame 2, suction headers 6 and manifold 8 form so to speak, a bed horizontally disposed with respect to the liquid surface to be cleaned. The suction hose 12 hang downwardly from the bed for operational connection with a skimmer of this invention 14 mounted on the end of each suction hose 12. Adjacent to, but with allowance for freedom of movement of the skimmers 14, tie lines 16 are provided to allow the plurality of skimmers to "sweep" as a unit and additionally prevent blowing of the skimmer or skimmers out of the water in high winds. As may be appreciated, the length of the suction hose is dependant upon many factors, e.g., state of movement of water to be "swept," type of ship or barge used, or dock, speed of sweeping, ship, etc.

In the preferred embodiment of the invention, and particularly where the device used to skim pollutants from the seas, each skimmer 14 is joined with its respective suction hose 16 through a swivel joint 18 which allows a swinging movement of the skimmer throughout 360°.

Figure 5:
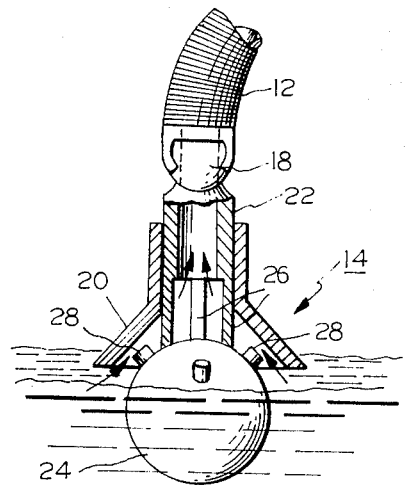
FIG. 5 is a side elevational view partly in section of a suction nozzle of this invention.
Figure 6:
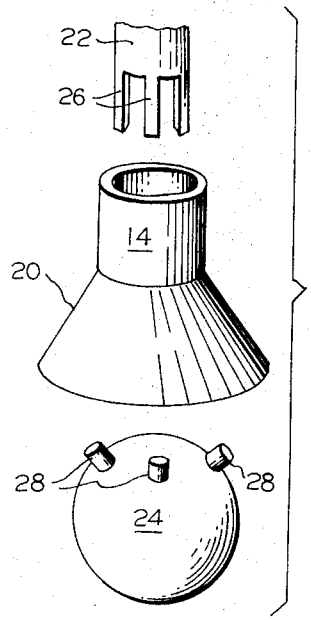
FIG. 6 is an exploded perspective view of the nozzle of FIGS. 4 and 5.

For a more detailed description of the skimmers 14 of this invention, reference is now made to FIGS. 4, 5 and 6. In FIGS. 4 and 5, a skimmer 14 is shown connected with flexible suction hose 12 by means of swivel joint 18. Nozzle 14 comprises a floatable hollow cone shaped member 20 slidably mounted on pipe section 22 and communicating with the interior of suction hose 12. A substantially spherical shaped float 24 is connected with pipe section 22 by means of fingers 26, preferably extensions from pipe section 22. Mounted on float 24 are stops 28 to prevent floatable cone member 20 from completely contacting float 24 to the end that the suction nozzle aperture would be completely closed. Floatable hollow cone member 20 and float 24 are designed and constructed in such manner and of such material that the base edge of cone member 20 will float on the surface or just within the upper surface of the lighter liquid, e.g., oil, to be removed, while float 24 floats partially in the heavier liquid, to the end that a suction aperture is formed between the lower edge of cone member 20 and float 24, which aperture lies wholly within the layer of pollutant. Cone member 20 being slidably mounted on pipe section 20 will allow the intake aperture to automatically adjust itself to the thickness of the floating pollutant. Should the layer of pollutant become negligible, the stops 28 will prevent complete closure of the nozzle. It is to be understood that the configuration of both members 20 and 24 may be greatly varied and still fall within the inventive concept.

Figure 7:
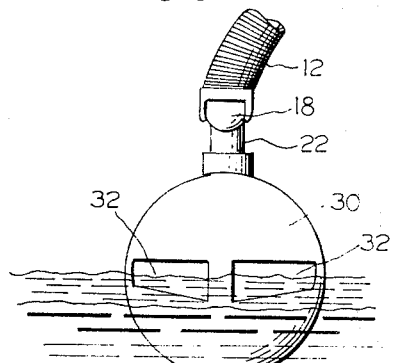
FIG. 7 is a side elevational view of another suction nozzle embodiment of this invention.
Figure 8:
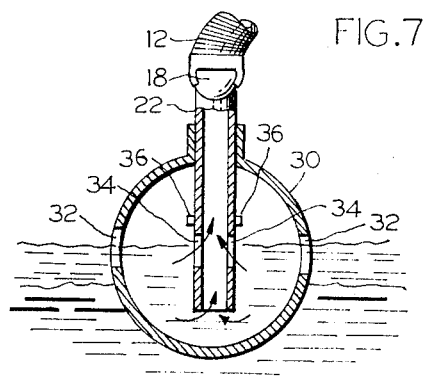
FIG. 8 is a side view in cross-section of the nozzle embodiment of FIG. 7.

In FIGS. 7 and 8 there is depicted another embodiment of this invention wherein the nozzle comprises a buoyant ball member 20 slidably mounted on pipe section 22. Ball member 30 contains at least one inlet aperture 32 longitudinally arranged in the mid-section of the ball member and is adjusted by construction materials in relation to the densities of the heavier and lighter liquids in such manner that the inlet apertures 32 will be disposed in the lighter liquid. Stops 36 are provided to prevent ball member 30 from sliding off of suction pipe 22.

As it may well be appreciated from the foregoing description, the invention provides means for effectively removing impurities floating on the surface of water and particularly water-immiscible liquids, like oil having a lower specific gravity than water, or finely divided solid, floating pollutants. In operation, the bed or frame 2 is placed into a horizontal position at a height above the surface to be skimmed determined by the length of the flexible suction hose 12. As discussed hereinbefore, the length of the flexible hose may be varied in accordance with, particularly, the body of water swept. The tie lines 16, which may be of any non-corrosive, non-fouling material, e.g., nylon while holding the flexible hose 12 and nozzles 14 in a "mattress configuration" allows the plurality of hose and nozzles a freedom to move as a unit, and individually, according to wind and wave motion.

Where swivel joint connections 18 are used to connect the suction nozzles 14 with the flexible suction hose 12, additional freedom movement is provided for the nozzle to conform to the surface movement of the smallest degree of surface movement. With the inlet of the inventive suction nozzle disposed within the polluting material, the pollutant is sucked through the nozzles 14, suction 12 hose, headers 6 into the manifold 8, through conduit 10 into collecting tanks aboard the vessel, ashore, or into floating plastic containers for later disposal. The negligible amounts of water which may be collected may be later separated by, for example, simple gravity separation in the collecting tanks.

From the foregoing description and drawings of the invention, numerous modifications will be obvious to those skilled in the art without departing from the spirit and scope of the invention as set forth in the appended claims.

I claim:

1. A skimmer apparatus for removing liquid pollutants floating on the surface of another liquid comprising:
   (A) a flexible suction hose connected on one end with a vacuum pump;
   (B) a suction pipe connected on the other end of said suction hose and having a suction inlet therein; and
   (C) a floating skimmer having at least one inlet aperture therein, said skimmer being of such density when immersed in the body of liquids as to maintain the inlet aperture within a layer of pollutant, said skimmer member being slidably mounted on said suction pipe for slidable movement in response to the level of the liquid in which it floats.

2. The apparatus of claim 1 wherein said suction pipe is connected with said suction hose by means of a swivel joint.

3. The skimmer of claim 1 wherein said floating skimmer comprises:
   (A) a hollow cone shaped member slidably mounted on said suction pipe, said member being of such density that the base edge thereof floats within the upper surface of the polluting fluid;
   (B) a float member mounted on the free end of said suction pipe, said float member being of such configuration and density as to float partially within the heavier liquid, a suction aperture being formed between the base edge said cone shaped member and the surface of said float member, and said suction aperture lying wholly within the layer of pollutant;
   (C) a stop member mounted on said float to prevent said hollow cone member from contacting said float and closing the aperture.

4. An apparatus for removing pollutants floating on the surface of a liquid comprising:
   (A) a supporting frame suspended above the surface of the floating pollutant material to be removed;
   (B) a plurality of headers connected by a manifold and mounted on said frame;
   (C) a suction pump connected to said manifold; and
   (D) a plurality of skimmers connected with each of said headers, each skimmer comprising:
      (1) a flexible hose connected on one end to said header;
      (2) a pipe section having a suction inlet therein connected to the other end of said flexible hose;
      (3) a suction nozzle connected with said pipe section having at least one suction inlet therein, said nozzle being of such shape and density that the suction inlet therein lies within the pollutant; and
      (4) said nozzle being slidably mounted on said suction pipe.

5. The apparatus of claim 4 wherein said suction nozzle comprises:
   (A) a hollow cone shaped member of such density that the base edge thereof floats just within the upper surface of the pollutant to be removed;

(B) a float member mounted on the end of said suction pipe, said float member being of such configuration and density as to float partially within the heavier liquid in such manner as to provide an inlet aperture between the base edge of said cone member and said float member, said aperture lying wholly within said pollutant; and (C) a stop member to prevent said aperture from becoming completely closed.

6. An apparatus for removing pollutants floating on the surface of a liquid comprising:

(A) a header;
(B) means for maintaining said header above the surface of the pollutant to be removed;
(C) a suction pump connected to said header; and
(D) at least one skimmer connected with said header, and comprising:
   (1) a flexible hose member connected on one end to said header;
   (2) a pipe section connected on the other end of said hose member and having a suction inlet therein;
   (3) a hollow cone shaped member slidably mounted on said pipe section, said slidable member being of such density that the base edge thereof floats just within the upper surface of the pollutant;
   (4) a float member mounted on the free end of said pipe section and being of such density and configuration as to float partially within the heavier liquid;
   (5) a suction aperture defined by the base edge of said cone shaped member and the surface of said float member, said aperture lying wholly within the layer of pollutant to be removed; and
   (6) stop means to prevent said cone member from contacting said float in such manner as to close said aperture.

References Cited

UNITED STATES PATENTS

| | | | |
|---|---|---|---|
| 2,891,672 | 6/1959 | Veld et al. | 210—242 |
| 3,109,812 | 11/1963 | McAulay et al. | 210—242 |

JAMES L. DeCESARE, Primary Examiner

U.S. Cl. X.R.

210—523